May 30, 1961 T. G. GRANRYD 2,986,294
BUCKET OPERATING MEANS FOR TRACTOR LOADERS
Filed Oct. 17, 1958 4 Sheets-Sheet 1
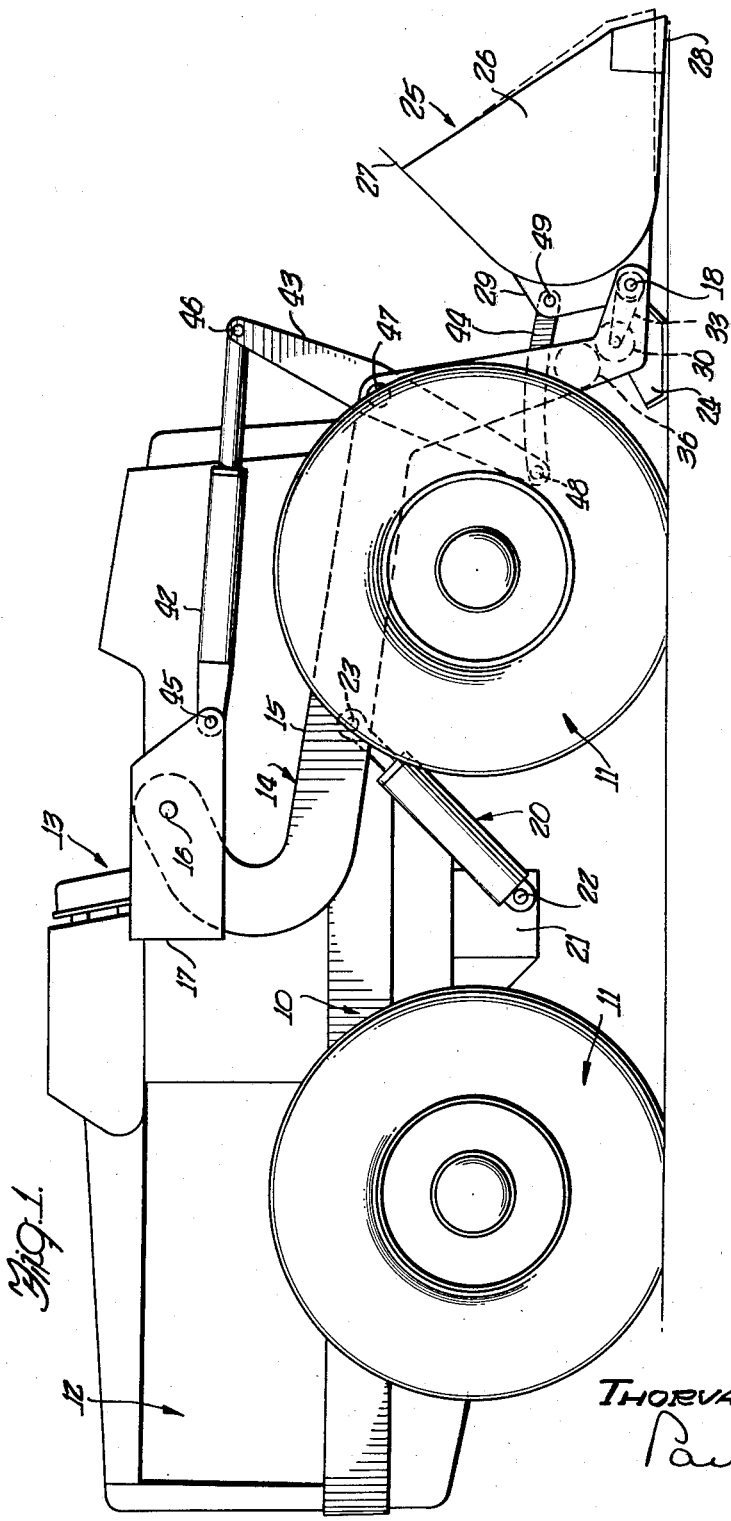
INVENTOR
THORVALD G. GRANRYD
Paul O. Pippel
ATTORNEY May 30, 1961  T. G. GRANRYD  2,986,294
BUCKET OPERATING MEANS FOR TRACTOR LOADERS
Filed Oct. 17, 1958  4 Sheets-Sheet 2
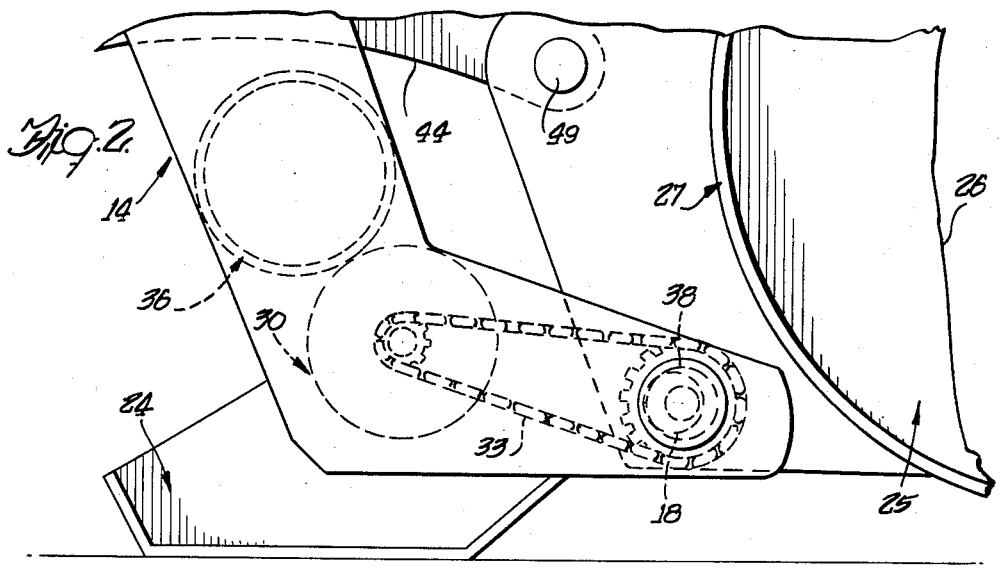
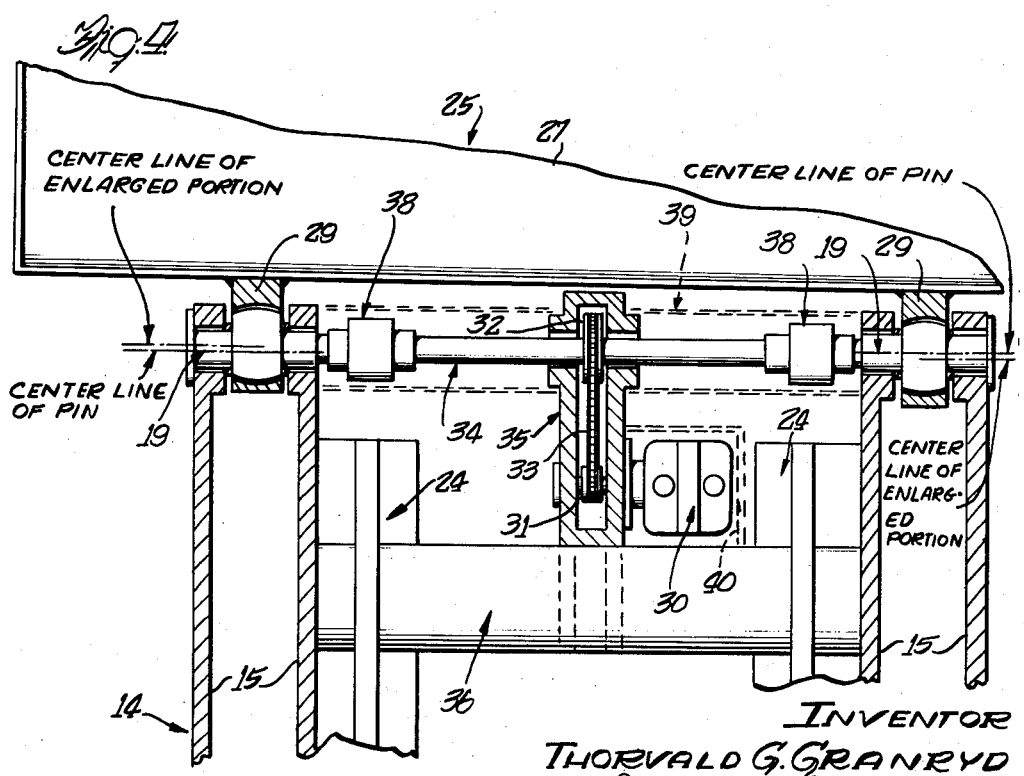
INVENTOR
THORVALD G. GRANRYD
Paul O. Pippel
ATTORNEY May 30, 1961 T. G. GRANRYD 2,986,294
BUCKET OPERATING MEANS FOR TRACTOR LOADERS
Filed Oct. 17, 1958 4 Sheets-Sheet 3
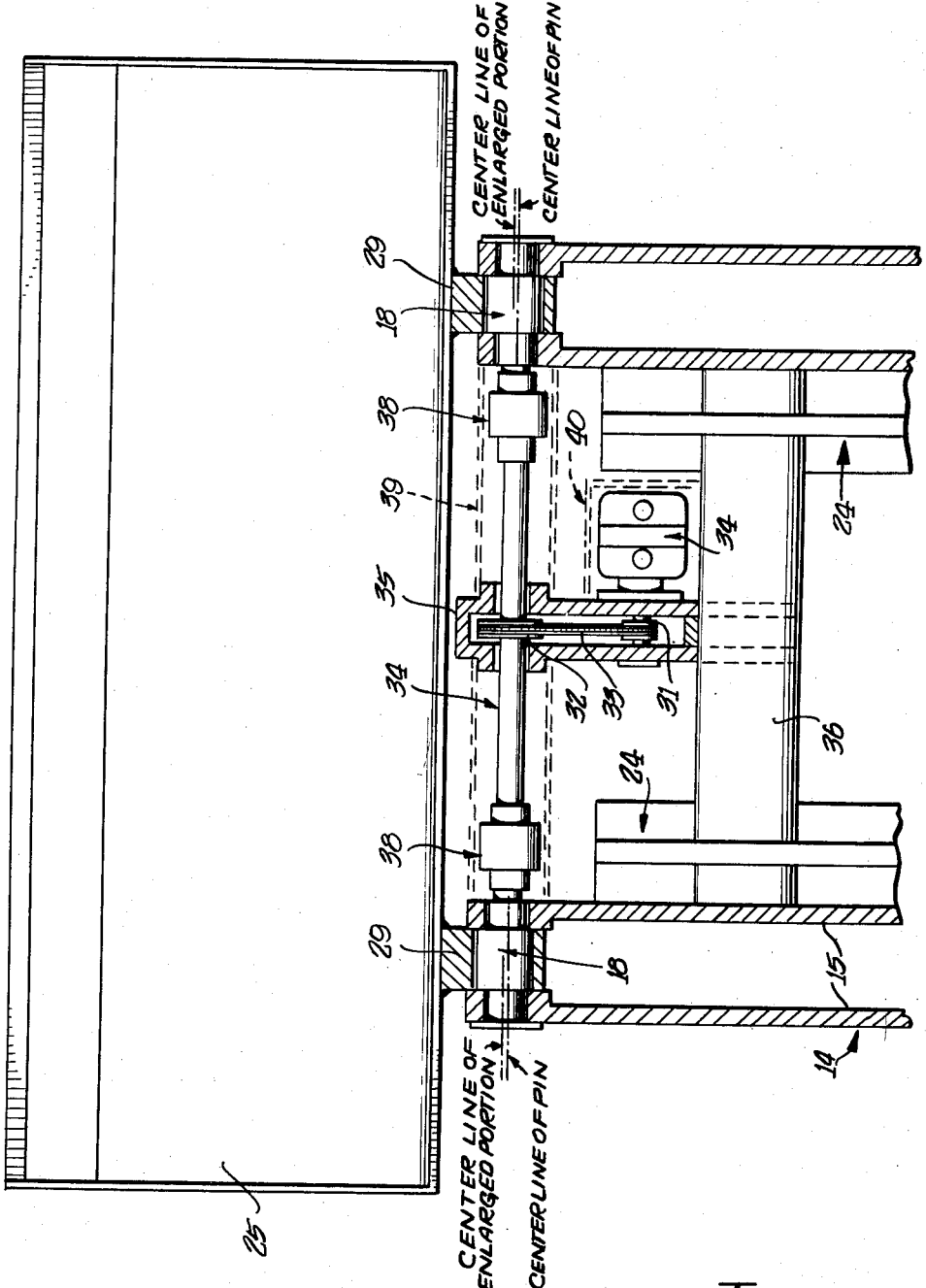
INVENTOR
THORVALD G. GRANRYD
Paul O. Pippel
ATTORNEY May 30, 1961 T. G. GRANRYD 2,986,294
BUCKET OPERATING MEANS FOR TRACTOR LOADERS
Filed Oct. 17, 1958 4 Sheets-Sheet 4

INVENTOR
THORVALD G. GRANRYD
Paul O. Pippel
ATTORNEY

United States Patent Office 2,986,294
Patented May 30, 1961

2,986,294

BUCKET OPERATING MEANS FOR TRACTOR LOADERS

Thorvald G. Granryd, Libertyville, Ill., assignor to The Frank G. Hough Co., a corporation of Illinois Filed Oct. 17, 1958, Ser. No. 767,919

16 Claims. (Cl. 214—140)

This invention relates generally to tractor loaders, and more specifically to improved means for operating the bucket of a front end type tractor loader.

Front end type tractor loaders, as generally known in the art, comprise a tractor either of the crawler or four-wheel rubber tired type carrying a bucket or other material handling implement forwardly of the tractor with means for moving the bucket through its various operating positions. In operation, the tractor is moved to force the cutting edge of the bucket into the material being worked and the bucket is then either raised through the material or pivoted in the material to cause the desired filling of the bucket. With the known types of bucket action used in the art, difficulty is often encountered in the digging and filling of the bucket when a hard packed material is being worked, and in the dumping of the bucket when relatively sticky materials are worked. Where the bucket of a front end loader is hydraulically operated, the attempted digging of hard packed materials results in substantial losses in power by the heat produced in the hydraulic system.

It is the object of the present invention to provide an improved bucket action in digging which will facilitate the digging and loading of the bucket thereof especially in working of hard packed materials.

It is another object of the present invention to provide an improved bucket action in dumping which will facilitate the dumping of the bucket thereof especially in the working of relatively sticky materials.

It is another object of the present invention to provide a front end type tractor loader with bucket operating means which will permit the bucket to be either simultaneously or alternately operated in three different digging actions.

It is another object of the present invention to provide means in a hydraulically operated front end loaded for greatly reducing heat losses in the hydraulic system thereof when working hard packed materials.

It is a further object of the present invention to provide means under the control of the operator of a front end type tractor loader for relatively rapidly oscillating the cutting edge of the bucket thereof during a digging and loading cycle.

It is another object of the present invention to provide means under the control of the operator of a front end type tractor loader for vibrating the bottom wall of the bucket thereof during a dumping operation.

It is another object of the present invention to provide means operating automatically during a digging operation with the bucket of a front end type tractor loader to oscillate the cutting edge of the bucket whenever the bucket encounters a certain predetermined resistance to digging and loading.

It is a further object of the present invention to provide in a front end type tractor loader having a hydraulic system for moving the bucket, other hydraulic systems, either under the control of the operator or automatically operating, for oscillating the cutting edge of the bucket to aid in the digging and filling thereof.

Other objects and features of the present invention will be apparent upon a perusal of the following specification and drawings of which:

Figure 1 is a side elevational view of a front end type tractor loader constructed according to the present invention;

Figure 2 is an enlarged view of a portion of the structure shown in Figure 1;

Figure 3 is an enlarged plan view of the forward portion of the structure shown in Figure 1;

Figure 5:
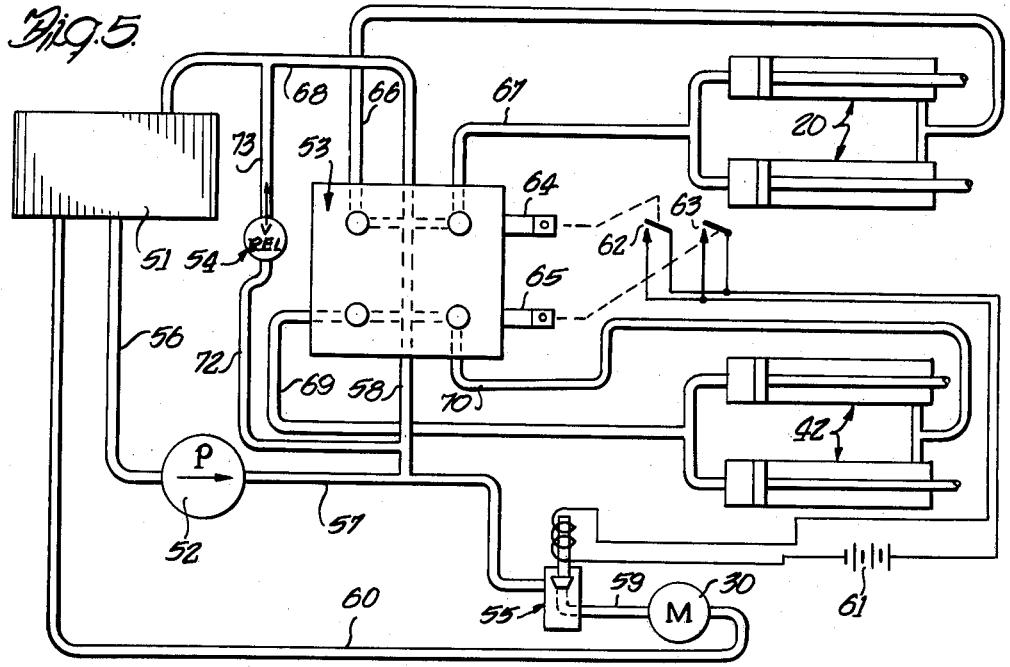
Figure 6:
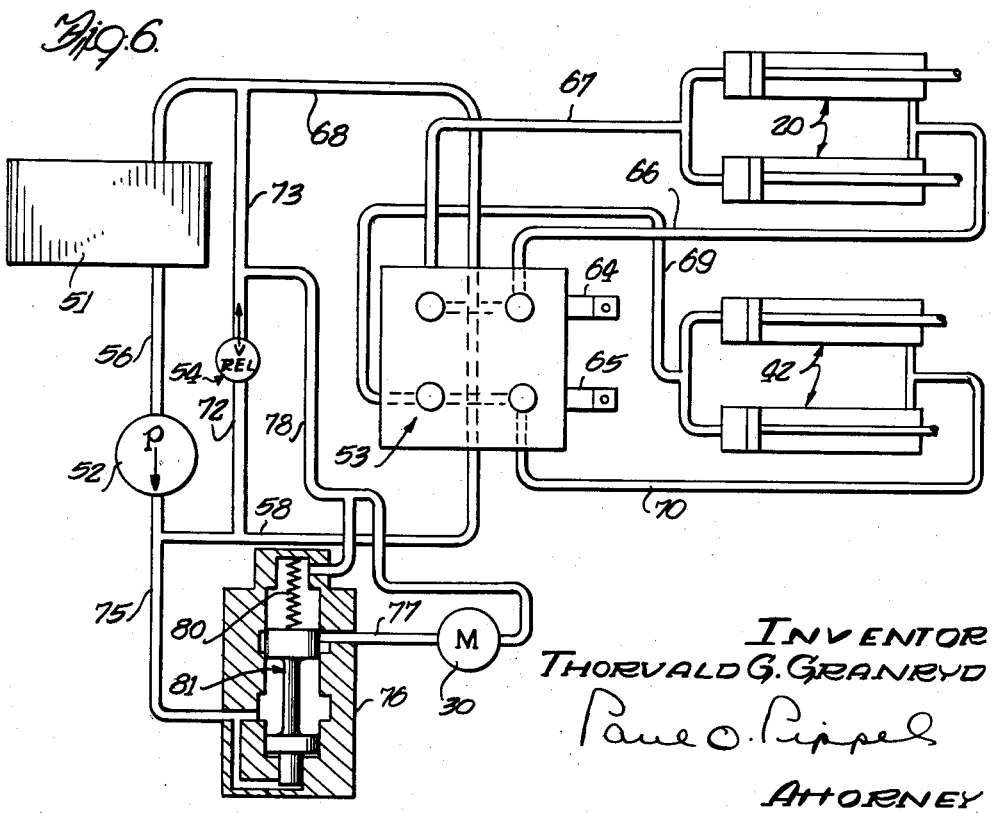

Figure 4 which is a view similar to Figure 3 shows another embodiment of the present invention; and Figures 5 and 6 show embodiments in diagrammatic form of the hydraulic systems for operating the present invention.

The present embodiments are the preferred embodiments but it is to be understood that changes can be made in the present embodiments by one skilled in the art without departing from the spirit and scope of the present invention.

For a general description of the present invention reference is made to the drawings. The front end type tractor loader of the present invention is provided with a tractor of the four-wheel rubber-tired type. Boom and linkage means are carried on the tractor and extend forwardly thereof. A bucket is operatively carried on the forward end of the boom and linkage means. A pair of hydraulic rams connected between the tractor and the boom provide for raising and lowering of the bucket. A second pair of hydraulic rams included in the linkage means, which is connected between the tractor, the boom and the bucket, are provided for pivoting the bucket relative to the boom and holding or maintaining the bucket in any one pivoted position. A third hydraulic motor is provided and is carried on the boom. The third hydraulic motor is connected to rotate the pins which pivotally interconnect the bucket and the boom. These pins are provided with a centrally disposed enlarged portion which is eccentric to the end portions thereof. When these pins are rotated, the resulting movement is a relatively small upward and downward oscillation of the bucket and particularly the bottom wall and the cutting edge carried at the forward edge of the bottom wall of the bucket. In one embodiment of the present invention, the hydraulic systems for operating the various hydraulic rams and motors are so constructed that the operator may selectively operate the hydraulic motor for rotating the bucket mounting pins. Another embodiment of the hydraulic systems of the present invention provides for automatic operation of the hydraulic motor whenever the hydraulic systems for the hydraulic rams produce a hydraulic pressure indicative of a need for oscillation of the cutting edge. In each of the embodiments of the invention, the hydraulic motor is connected in parallel with the hydraulic rams so that whenever the hydraulic rams are substantially stopped by a hand packed material, substantially all of the hydraulic pump output may be used to operate the hydraulic motor. The increased flow to the motor will cause an increase in the frequency of oscillation of the bucket and cutting edge.

For a detailed description of the present invention reference is again made to the drawings. The tractor of the present invention comprises a frame 10 supported on four wheels 11 and has an engine compartment 12 carried thereon at the rearward end thereof and an operator's compartment 13 carried thereon forwardly of the engine compartment 12.

The loader mechanism of the present invention comprises a boom 14 which comprises duplicate boom arms disposed on each side of the tractor. Each boom arm is fabricated from a pair of substantially identical plates 15 secured in a spaced apart relationship as can be seen in Figures 3 and 4. The plates 15 are somewhat S-shaped and the rearward end of each pair of plates 15 is pivotally carried on one side of the tractor by a pin 16. Each pin 16 is carried between one side of the tractor and a plate 17 which extends outwardly from the sides of the tractor. The forward portions of the boom arms of the boom 14 are rigidly interconnected by a tubular member 36. Skid shoes 24 are secured to the tubular member 36 and depend therefrom and provide for skidding of a load along the ground. The forward end of each plate 15 of the boom 14 is formed as a bearing so that the end portions of pins 18 of Figures 1, 2 and 3 and the pins 19 of Figure 4 are rotatable therein. The boom 14 is selectively raised and lowered about its pivotal connection to the tractor by a pair of hydraulic rams 20. The hydraulic rams 20 are disposed on opposite sides of the tractor and the head end of each is pivotally connected to a bracket 21 by means of a pin 22. The brackets 21 are secured to the frame 10 to depend therefrom. The rod end of each hydraulic ram 20 is pivotally connected to one of the boom arms of the boom 14 by means of pivotal mounting means 23.

The bucket 25 of the loader mechanism comprises a pair of spaced apart side walls 26 interconnected by a plate 27 forming the rear and bottom walls of the bucket. A cutting edge 28 is secured along the forward marginal edge of the bottom wall and the lower forward edge of the side walls 26 of the bucket 25. The rear wall of the bucket 25 is provided with a pair of horizontally spaced apart vertically aligned flanges 29. The lower portion of each flange 29 is formed as a bearing which is cylindrical in the embodiment shown in Figures 1, 2 and 3 and is somewhat spherical as shown in the embodiment of Figure 4.

The pins 18 of the embodiment shown in Figures 1, 2 and 3 are positioned with the center portion thereof journalled in the bearings of the flanges 29 and with the end portions thereof journalled in the bearings in the end of the boom 14 thereby pivotally mounting the bucket 25 on the forward end of the boom 14. The pins 18 are formed so that the center portion thereof is substantially larger in diameter than the end portions and the axis of the center portion does not coincide with the axis of the end portions but is spaced therefrom a certain distance and disposed parallel thereto to provide a certain eccentricity. The pins 18 are disposed relative to each other so that the axes of the end portions are along the same horizontal axis and so that the axes of the enlarged center portions are also along the same horizontal axis. Thus it may be seen that when the pins 18 are rotated, the bucket 25 through the flanges 29 will be moved relative to the boom. This movement of the bucket will result in a slight upward-downward and forward-rearward movement of the cutting edge 28 of the bucket 25.

The pins 19 shown in the embodiment of Figure 4 are similar to pins 18 in that the center enlarged portion of each pin 19 has its axis radially displaced from and parallel to the axis of the end portions. The enlarged center portions of the pins 19 are also somewhat spherical. The end portions of the pins 19 are journalled in the bearings in the forward end of the boom 14 and the center enlarged portions of the pins 19 are journalled in the somewhat spherical bearings in the flanges 29. The pins 19 are so disposed relative to each other that the axes of the end portions are along the same horizontal line and so that the axes of the center portions are out of phase with each other or are disposed on different axes parallel to the axis of the end portions. This disposition of the pins 19 in comparison to the first embodiment compounds the movement of the bucket 25 when the pins 19 are rotated in that one side of the cutting edge will be moved rearwardly as the other side thereof is moved forwardly.

The means for driving or rotating the pins 18 of the first embodiment and the pins 19 of the second embodiment of the present invention comprises a hydraulic motor 30, a pair of sprockets 31 and 32, a chain 33 and a shaft 34. A suitable housing 35 is provided for carrying these elements and is secured to the cylindrical member 36 carried between the boom arms. The hydraulic motor 30 which may be of any suitable type known in the art is secured to the housing 35 with its shaft projecting into the housing 35. The sprocket 31 is keyed on the end of the shaft of the hydraulic motor 30. The shaft 34 is journalled through the housing 35 and the sprocket 32 is keyed to the shaft 34 within the housing 35. The chain 33 is positioned about the sprockets 32 and 31 and the sprocket 32 is larger than the sprocket 31 so that when the hydraulic motor 30 is operated, the sprocket 31 will be rotated to drive that shaft 34 through the chain 33 and sprocket 32 at a lower speed than the speed of the motor 30. The ends of the shaft 34 are coupled to drive the pins 18 through two flexible type connections 38. The elements 39 and 40 shown in dotted lines are guards which are intended to protect the driving means for the pins 18 from accidental damage or dirt. Substantially the same means is shown in Figure 4 for driving the pins 19. The particular means shown for driving the pins 18 and 19 are not intended as the only means by which those pins may be driven. If found desirable, the sprocket 31 may be made larger than the sprocket 32 or if the hydraulic motor operates at a suitable speed, the hydraulic motor may be directly coupled in the shaft 34. Suitable power means other than a hydraulic motor may also be used in place of the hydraulic motors 30.

The linkage means of the present invention which further supports and controls the movement of the bucket 25 comprises a pair of hydraulic rams 42, a pair of levers 43 and a pair of links 44. The head end of each hydraulic ram 42 is pivotally mounted on one side of the tractor inwardly of the plate 17 by a pin 45. The rod end of each hydraulic ram 42 is pivotally connected to one of the levers 43 by a pin 46. Each of the levers 43 is pivotally connected intermediate its ends to one of the boom arms of the boom 14 intermediate the ends thereof by a pin 47. The other end of each lever 43 is pivotally connected to one end of one of the links 44 by a pin 48. The other end of each of the links 44 is pivotally connected to one of the flanges 29 substantially above the pivotal connection of the bucket 25 on the boom 14 by a pin 49. Thus it may be seen that when the hydraulic rams 42 are extended, the levers 43 are pivoted clockwise as viewed in Figure 1 and the links 44 are moved to pivot the bucket counterclockwise as viewed in Figure 1. When the hydraulic rams 42 are retracted, the opposite action takes place and the bucket 25 is pivoted clockwise as viewed in Figure 1.

Turning next to the two embodiments of the hydraulic systems for operating the hydraulic rams 20 and 42 and the hydraulic motor 30 as shown diagrammatically in Figures 5 and 6, reference is first made particularly to Figure 5. The necessary hydraulic conduits are not shown in Figures 1 through 4 for the purpose of keeping the showings in those figures simple and clear. The hydraulic systems embodiment of Figure 5 comprises a reservoir 51, a hydraulic pump 52, a hydraulic valve 53, a pressure relief valve 54, a solenoid valve 55, the hydraulic motor 30 and suitable electric circuits and hydraulic conduits. The inlet side of the hydraulic pump 52 is connected to the reservoir 51 through a hydraulic conduit 56. The outlet of the hydraulic pump 52 is connected to conduit 57 which in turn is connected to the solenoid valve 55 and through conduit 58 to the hydraulic valve 53. The outlet side of the solenoid valve 55 is connected to one side of the hydraulic motor 30 by conduit 59. The other side of the hydraulic motor 30 is connected to the reservoir 51 by conduit 60. The solenoid coil of the solenoid valve 55 is connected by an obvious electrical circuit in series with a source of electrical power 61 and a pair of switches 62 and 63 such that when either of the switches 62 or 63 is closed, the circuit is completed to energize the solenoid coil and open the solenoid valve 55 to permit hydraulic fluid under pressure to flow to the hydraulic motor 30.

The hydraulic valve 53 which may be of any suitable type known in the art is provided with two valve spools 64 and 65 which will cooperate with the remainder of the valve in a manner such that valve spool 64 may be selectively moved to different positions to deliver high pressure hydraulic fluid from conduit 58 to either conduit 66 or 67 while returning hydraulic fluid from the conduit not receiving high pressure hydraulic fluid to conduit 68 for return of hydraulic fluid to the reservoir 51. The valve spool 65 cooperates with the remainder of the valve 53 in a similar manner so that valve spool 65 may be selectively operated to different positions to deliver high pressure hydraulic fluid from conduit 58 to either conduit 69 or 70 while directing hydraulic fluid from the conduit not receiving high pressure hydraulic fluid to conduit 68 for return of hydraulic fluid to the reservoir 51. Conduit 66 is connected in parallel to the rod end of the cylinders of the hydraulic rams 20 and conduit 67 is connected in parallel to the head end of the hydraulic rams 20. Conduit 70 is connected in parallel to the rod ends of the hydraulic rams 42 and conduit 69 is connected in parallel to the head ends of the hydraulic rams 42. Thus it may be seen that by the appropriate selected operations of spool 64, the hydraulic rams 20 are extended or retracted and by appropriate selected operations of the valve spool 65, the hydraulic rams 42 are extended and retracted. Suitable levers (not shown) are connected to the valve spools 64 and 65 to provide for easy operation thereof from the operator's compartment 13. The switches 62 and 63 are mounted on those levers so that the operator may easily close or open either of the switches 62 or 63 while he is operating one of the levers controlling the movement of the valve spools 64 and 65. The pressure relief valve 54 is connected by conduit 72 to conduit 58 and by conduit 73 to conduit 68 and operates to bypass hydraulic fluid from the high pressure side of the system to the reservoir 51 whenever the hydraulic fluid pressure in the high side exceeds a certain predetermined value.

Turning next to the embodiment of the hydraulic system shown in Figure 6, parts substantially identical to those shown in Figure 5 are designated with the same numerals. In the second embodiment of the hydraulic system for the present invention, the reservoir 51 is again connected to the inlet of the pump 52 by conduit 56. The outlet of the pump 52 is connected to the hydraulic valve 53 by conduit 58. The outlet of the hydraulic pump 52 is also connected by conduit 75 to one side of a hydraulic valve 76. The other side of the hydraulic valve 76 is connected to the hydraulic motor 30 by conduit 77. The other side of the hydraulic motor 30 is connected by conduit 78 to conduit 73 which in turn is connected to conduit 68 connected to the reservoir 51. The pressure relief valve 54 is connected by conduits 72 and 73 between the high and low pressure sides of the hydraulic system. The hydraulic valve 53 is supplied high pressure hydraulic fluid from conduit 58 and is connected to the reservoir 51 through conduit 68. Hydraulic rams 20 are connected to the valve 53 by conduits 66 and 67 and hydraulic rams 42 are connected to hydraulic valve 53 through conduits 69 and 70. Valve spool 64 controls the operation of hydraulic rams 20 and valve spool 65 controls the operation of hydraulic rams 42. The hydraulic valve 76 which is shown somewhat diagrammatically in cross section is biased by a coiled spring 80 to the closed position. The coiled spring 80 is calibrated relative to the working areas of the valve spool 81 of the valve 76 so that whenever the hydraulic fluid pressure reaches a certain value, less than that pressure at which pressure relief valve 54 opens, the valve spool 81 will be moved to unblock the annular groove in the body of the valve 76, which is connected to conduit 77, to permit hydraulic fluid to flow from conduit 75 through the valve 76 to and through conduit 77. Thus it may be seen that whenever the hydraulic fluid pressure in the high side of the system reaches a certain predetermined value, the hydraulic motor 30 will be operated. Although not shown, either of the hydraulic systems shown in Figures 5 or 6 may be used in the embodiments of the present invention shown in the other figures.

Turning next to a description of the operation of the present invention in order that the construction thereof may be more readily understood, reference is again made to the drawings. Assuming a digging operation with the bucket disposed such as shown in Figure 1, the tractor is moved until the cutting edge 28 of the bucket 25 engages the material to be dug. As the tractor is moved forwardly, the cutting edge 28 is forced into the material filling the bucket. As the load upon the bucket increases, the reaction caused thereby will cause the hydraulic fluid pressure in the hydraulic systems to be increased. With the hydraulic system of Figure 6, if the hydraulic fluid pressure reaches that for which the hydraulic valve 76 is calibrated, the valve 76 will operate to cause operation of the hydraulic motor 30. With the embodiment of the present invention shown in Figure 3, the resulting operation of the hydraulic motor 30 will cause rotation of the pins 18 to oscillate the cutting edge and forward portion of the bucket 25 within a range substantially as shown by the solid and dotted lines of Figure 1. This action of the bucket will greatly aid the digging and bucket filling operation of the subject tractor loader. As the bucket is filled, the operator may operate the valve spool 65 to extend the hydraulic rams 42 to pivot the bucket 25 rearwardly in a break-out action. Again with the embodiment of Figure 6, if at any time during the break-out operation of the bucket 25 the hydraulic fluid pressure causes operation of the valve 76, the motor 30 will again be operated in its oscillating operation to aid the break-out operation.

Coincidentally with the operation of the hydraulic rams 42 or independently thereof, the operator may operate valve spool 64 to extend the hydraulic rams 20 in a load-scooping action. If at any time during the load-scooping action, the hydraulic fluid pressure in the high pressure side exceeds the value for which valve 76 is adjusted, the valve 76 will operated to cause operation of the hydraulic motor 30. Again, the bucket 25 will be oscillated by the rotation of the pins pivotally interconnecting the bucket 25 and the boom 14.

From the foregoing description, it may be seen that with the embodiment of the hydraulic system shown in Figure 5, it is merely necessary that the operator close either switch 62 or 63 to selectively operate hydraulic motor 30. The closing of the switches 62 and 63 may be conveniently accomplished by the operator during either operation of the hydraulic rams 20 or 42. With the operation of this system and the one previously described, a unique operation takes place automatically in that if either of the hydraulic rams 20 or 42 is stopped by a load such as a relatively hard packed earth, all of the output of pump 52 will be delivered to the motor 30 to increase the frequency of oscillations thereof and further aid in working the hard material and freeing rams 20 or 42 so that they may again perform their normal functions. A feature of the hydraulic system shown in Figure 5 is that during a dumping operation, an operation occurring when the hydraulic rams 42 are substantially completely retracted, the hydraulic motor 30 may be operated to oscillate the bucket 25 to aid in clearing material from the confines of the bucket.

It has been additionally found that with materials which are not sticky, the rams 42 need only be partially retracted so that the bottom of the bucket 25 is substantially horizontal and oscillation of the bucket 25 will then substantially completely empty the bucket 25 of its load by the vibration of the load from the bucket 25.

This feature obviously provides additional dumping height.

It should be noted that in considering the oscillating movement of the bucket 25 with the construction shown in Figure 3, that due to the construction of the linkage means, the upward and downward components of movement of the bucket 25 relative to the boom 14 will cause a slight upward and downward pivoting of the links 44 about the pins 48 and the forward and rearward components of movement of the bucket 25 relative to the boom 14 will react against the links 44 as essentially stationary members. With the embodiment of the present invention shown in Figure 4 there is also a movement of the bucket 25 in a horizontal plane such that one side of the bucket 25 will be moved forwardly as the other side thereof is moved rearwardly.

A further advantage of the present invention is the inherent ability of the construction to provide for different digging actions in different materials by changing the periodicity of the bucket movements as caused by rotation of the pins 18 or 19. This may be done by either varying the speed of the rotation of the pins 18 or 19 or by changes in the sizes of the center portions of the pins relative to the end portions thereof.

Having described the invention what is considered new and desired to be protected by Letters Patent is:

1. In a tractor loader, a boom pivotally carried on said tractor and extending forwardly thereof, a bucket, pin means pivotally connecting said bucket to the forward end of said boom, said pin means being formed so that the rotation thereof causes movement of said bucket relative to said boom, and means for rotating said pin means.

2. In a tractor loader, a boom pivotally carried on said tractor and extending forwardly thereof, a bucket, pin means pivotally connecting said bucket to the forward end of said boom, link means connected to said bucket for holding said bucket to prevent the pivoting thereof along any line through the connection of said link means to said bucket and tangent to a circle having its center coincident with the pivotal axis of said bucket on said boom, said pin means being formed to move said bucket about the pivotal axis of said bucket on said boom responsive to the rotation of said pin means.

3. In a tractor loader, a boom pivotally carried on said tractor and extending forwardly thereof, a bucket, pin means pivotally connecting said bucket to the forward end of said boom, link means connected between said tractor and said bucket for pivoting said bucket relative to said boom and for holding said bucket to prevent the pivoting thereof along any line through the connection of said link means to said bucket and tangent to a circle having its center coincident with the pivotal axis of said bucket on said boom, said pin means being formed to have a central enlarged portion which is eccentric to the end portions thereof, the end portions of said pin means being rotatively carried in said boom and said enlarged eccentric portion being rotatively carried in a flange carried on said bucket.

4. In a tractor loader, a boom comprising duplicate boom arms disposed on each side of the tractor, means pivotally connecting one end of each of said boom arms to said tractor, a bucket having a cutting edge disposed along the forward marginal edge of the bottom wall thereof, a pair of flanges mounted on the rear wall of the bucket, a pair of pins, each of said pins being journalled in the forward end of one of said boom arms and journalled through one of said flanges on said bucket, the portion of each of said pins which is journalled in said flanges being of a diameter greater than the diameter of the portion thereof journalled in said boom arms, said enlarged portion of each of said pins being eccentric relative to the other portions thereof, link means connected between said tractor and said bucket for adjustably holding said bucket to prevent the pivoting thereof along any line through the connection of said link means to said bucket and tangent to a circle having its center coincident with the axis of the portion of said pins journalled in said boom arms, and means for rotating said pins.

5. In a tractor loader as claimed in claim 4, wherein said last mentioned means is connected to rotate said pins so that the enlarged portions thereof are out of phase with each other.

6. In a tractor loader as claimed in claim 4, wherein hydraulically operated means is provided for raising and lowering said boom, wherein second hydraulically operated means is provided in said link means for adjusting the position of said bucket relative to said boom, and wherein said means for rotating said pins comprises a hydraulic motor.

7. In a tractor loader as claimed in claim 6, wherein said first and second hydraulically operated means and said hydraulic motor are all connected in parallel to the same source of hydraulic fluid under pressure so that the speed of rotation of said hydraulic motor is increased when a substantial reaction force prevents the raising and lowering of said boom and the adjustment of said bucket relative to said boom.

8. In a tractor loader having a boom operatively carrying a digging bucket on the forward end thereof, means for oscillating said bucket relative to said boom comprising a rotating pin interconnecting said bucket and said boom, said pin having two portions, one of said portions journalled in said boom and the other of said portions journalled in said bucket, one of said portions being of a larger diameter and eccentric to the other portion, and means for rotating said pin to oscillate said bucket.

9. In a tractor loader as claimed in claim 8, wherein said last mentioned means comprises a hydraulic motor carried on said boom, and a mechanical power train extended from said motor to said pin.

10. In a material handling device, a material cutting edge supported from said device for engaging any material to be cut, a source of hydraulic fluid under pressure, hydraulically operated means connected to said cutting edge and connectable to said source of hydraulic fluid under pressure for moving said cutting edge through said material in a cutting operation, and second hydraulically operated means connected to said cutting edge and connectable to said source of hydraulic fluid under pressure for oscillating said cutting edge simultaneously with the movement thereof through said material, and means for connecting said second hydraulically operated means in parallel with said first hydraulically operated means to said source of hydraulic fluid under pressure whereby the available hydraulic fluid flow from said source of hydraulic fluid under pressure will be distributed to said first and second hydraulically operated means dependent upon the particular reaction forces produced on said cutting edge by said material.

11. In a material handling device, a load carrying bucket having a cutting edge rigidly secured along the forward marginal edge of the bottom wall thereof, means for supporting said bucket from said device for engaging said cutting edge with any material to be cut and deposited in said bucket, means for moving said cutting edge through said material in a cutting and bucket filling operation, and means reacting against said first mentioned means to oscillate said bucket so that the greatest amplitude of oscillation thereof occurs substantially in the plane of said bottom wall.

12. In a material handling device, a load carrying bucket having a cutting edge mounted along one edge thereof, means for supporting said bucket and said cutting edge for pivotal movement about a certain axis on said device, means including a pin cooperating with said last mentioned means for supporting said bucket and said cutting edge for pivotal movement about another axis, said pin having an enlarged eccentric portion rotatively carried in a flange on said bucket, and means for rotating said enlarged portion of said pin to oscillate said bucket and said cutting edge.

13. In a material handling device, a load carrying bucket having a cutting edge mounted along one edge thereof, means for supporting said bucket from said device for engaging said cutting edge with any material to be cut and deposited in said bucket, a source of hydraulic fluid under pressure, hydraulic fluid operated means for moving said bucket and said cutting edge through said material in a cutting and bucket filling operation, second hydraulic fluid operated means for oscillating said bucket and said cutting edge simultaneously with the movement thereof through said material to aid in the cutting and bucket filling operation, means connecting said source of hydraulic fluid under pressure in parallel with said first and second hydraulic fluid operated means so that the available hydraulic fluid flow from said source of hydraulic fluid under pressure will be distributed to said first and second hydraulic fluid operated means in amounts dependent upon the particular reaction forces produced on said cutting edge by said material.

14. In a material handling device, a load carrying bucket having a cutting edge mounted along one edge thereof, means supporting said cutting edge for pivotal movement about a certain axis on said device, means cooperating with said last mentioned means supporting said bucket and said cutting edge for pivotal movement about another axis, a source of hydraulic fluid under pressure, hydraulic fluid operated means for pivoting said bucket and said cutting edge about said certain axis, second hydraulic fluid operated means for pivoting said bucket and said cutting edge about said another axis, third hydraulic fluid operated means for oscillating said bucket and said cutting edge, and means connecting said first, second and third hydraulic fluid operated means in parallel with said source of hydraulic fluid under pressure so that the available hydraulic fluid flow from said source of hydraulic fluid under pressure will be distributed to said first, second and third hydraulic fluid operated means dependent upon the particular reaction forces produced on said bucket and said cutting edge by said material.

15. In a tractor loader, a bucket having a cutting edge rigidly secured on the forward marginal edge of the bottom wall thereof, a boom pivotally connected to said tractor and extending forwardly thereof, means connected between the rear wall of said bucket substantially in the plane of said bottom wall and the forward end of said boom for supporting said bucket on said boom and operable to oscillate said bucket at the connection thereto, and linkage means connected to the rear wall of said bucket above the support thereof on said boom for holding said bucket so that the greatest amplitude of oscillation of said bucket occurs substantially in the plane of said bottom wall.

16. In a tractor loader, a boom carried on said tractor and extending forwardly thereof, a digging bucket, pin means including a pin pivotally connecting said digging bucket to the forward end of said boom, said pin means including means operable to oscillate said entire bucket relative to said boom responsive to movements of said pin, and means for moving said pin.

References Cited in the file of this patent
UNITED STATES PATENTS

| | | |
|---|---|---|
| 1,840,002 | Wallis | Jan. 5, 1932 |
| 2,449,620 | Aldermann | Mar. 7, 1950 |
| 2,820,555 | Lessmann | Jan. 21, 1958 |